US012491718B2

(12) United States Patent
Cabello Cabrera et al.

(10) Patent No.: US 12,491,718 B2
(45) Date of Patent: Dec. 9, 2025

(54) PRIMING PRINTHEADS

(71) Applicant: Hewlett-Packard Development Company, L.P., Spring, TX (US)

(72) Inventors: Sheila Cabello Cabrera, Sant Cugat del Valles (ES); Mauricio Seras Franzoso, Sant Cugat del Valles (ES); Andreu Cortes Vicens, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 121 days.

(21) Appl. No.: 18/264,485

(22) PCT Filed: Feb. 8, 2021

(86) PCT No.: PCT/US2021/017071
§ 371 (c)(1),
(2) Date: Aug. 7, 2023

(87) PCT Pub. No.: WO2022/169466
PCT Pub. Date: Aug. 11, 2022

(65) Prior Publication Data

US 2024/0042779 A1 Feb. 8, 2024

(51) Int. Cl.

| | |
|---|---|
| ***B41J 2/17*** | (2006.01) |
| ***B41J 2/175*** | (2006.01) |
| *B41J 2/165* | (2006.01) |

(52) U.S. Cl.
CPC ......... *B41J 2/1707* (2013.01); *B41J 2/17556* (2013.01); *B41J 2/16508* (2013.01); *B41J 2/16538* (2013.01)

(58) Field of Classification Search
CPC .. B41J 2/1707; B41J 2/16508; B41J 2/16538; B41J 2/17556
See application file for complete search history.

(56) References Cited

U.S. PATENT DOCUMENTS

| | | | |
|---|---|---|---|
| 6,513,904 B1 | 2/2003 | Taylor et al. | |
| 7,455,399 B2 | 11/2008 | Senior et al. | |
| 7,717,548 B2 | 5/2010 | Tatsumi et al. | |
| 8,356,877 B2 | 1/2013 | Lebron et al. | |
| 8,591,012 B2 | 11/2013 | Yoshino et al. | |
| 8,651,635 B2 | 2/2014 | Esdaile-Watts et al. | |
| 8,814,319 B2 | 8/2014 | Lebron et al. | |
| 10,022,973 B2 | 7/2018 | Tanner et al. | |
| 10,308,015 B2 | 6/2019 | Wagner et al. | |
| 10,449,777 B2 * | 10/2019 | Swier | B41J 2/17556 |

FOREIGN PATENT DOCUMENTS

JP 5791250 B2 10/2015

* cited by examiner

*Primary Examiner* — Geoffrey S Mruk
(74) *Attorney, Agent, or Firm* — Jordan IP Law, LLC

(57) ABSTRACT

Examples include a method for priming a printhead that comprises a bag associated with a pump. A first control signal, which corresponds to a first target pressure, is applied to the pump. Directly after the application of the first control signal, a second control signal, which corresponds to a second target pressure, is applied to the pump. The second target pressure is lower than the first target pressure.

7 Claims, 5 Drawing Sheets

PRIMING PRINTHEADS

BACKGROUND

This disclosure generally relates to a printer comprising printheads. A printer may allow printing text or images on a print substrate. A printer may also allow printing three dimensional objects. In some instances, a printhead is provided with nozzles that fire a printing fluid. The printing quality may vary over time or from printer to printer, in some examples due to printing fluid plug formation in the nozzles potentially resulting in lower printing quality.

BRIEF DESCRIPTION OF THE DRAWINGS

Various example features will be apparent from the detailed description which follows, taken in conjunction with the accompanying drawings, wherein.

DETAILED DESCRIPTION

In some instances, lower printing quality may be due to printing fluid plug formation in the path of a printing fluid from a printing fluid reservoir until ejection from a printhead. Printing fluid plug formation can impede or block printing fluid flow to and from firing chambers and nozzles in a printhead, potentially resulting in poor performance by the printhead and reduced printing quality. In some examples, when using pigmented printing fluids, pigment settling or crashing is a phenomenon which can hinder the flow of a printing fluid in the printhead. Pigment crashing can occur when stabilization forces, e.g., steric and electrostatic stabilization, in some examples due to electrostatic forces provided by surface-attached small molecules, oligomers or polymers, do not provide sufficient stabilization to keep pigments of the printing fluid sufficiently separated in space to prevent adjacent pigments from crashing on each other. Pigment crashing may in some examples take place after prolonged storage or environmental extreme conditions which can cause gravitational effects on relatively large pigment particles, random fluctuations, and/or degradation of a solvent of the printing fluid. Other factors such as evaporation of water and solvent from the printing fluid can also contribute to pigment crashing.

The present disclosure proposes limiting printing fluid plug formation issues by priming a printhead. Over time, the printhead can develop undesired obstructions in the printing fluid path, nozzle plate (also called "die") or any other area in the pathway the printing fluid travels through on its way to nozzles for ejection. These obstructions can result in parts of the printed output nozzles failing, introducing printing artefacts. Priming limits developing of unwanted obstructions in the pathway of the printing fluid. The present disclosure is in particular directed to blow priming, which is a method of servicing a printhead whereby a fluid, in some examples pressurized air, is introduced in the printhead, thereby forcing printing fluid out of the nozzles. When doing this, a peak appears in the nozzle plate pressure which is useful for removing debris from the printhead and/or substantially preventing or dissolving printing fluid plugs in the nozzles. The method hereby proposed allows priming a printhead in a simple, fast and cost effective way through a method permitting rapidly reaching an appropriate pressure without risking otherwise damaging the printhead. Due to the blow priming forcing fluid through the printhead, the printhead structure may be submitted during priming to internal pressures above operating pressure. Such internal pressures above operating pressures permit obtaining the blow priming effect desired. It is however important not to damage the printhead during such operation. The present disclosure permits reaching a satisfactory blow priming pressure, and to do so rapidly.

Figure 1A:
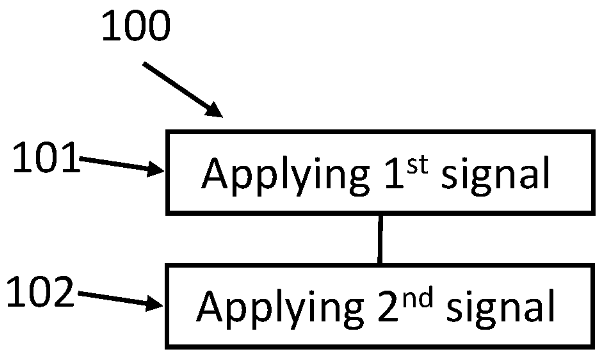
FIG. 1A is a block diagram of a first example method for priming a printhead according to the present disclosure.

FIG. 1A illustrates a first example method 100 for priming a printhead. An example printhead ejects drops of printing fluid through a plurality of nozzles formed therein. In particular, nozzles may be provided in a nozzle plate comprised in the printhead. In some examples, the nozzle plate comprises two or more columns of nozzles, each column comprising a plurality of nozzles. In some examples, each column of nozzles comprises more than fifty nozzles. In other examples, each column of nozzles comprises more than one hundred nozzles. In other examples, each column comprises more than two hundred nozzles.

An example printhead can include a chamber in which a bag is housed. An example bag is made of an elastomeric material. The bag is configured to be inflated by introducing a fluid therein. The fluid may be air coming from a pump associated to the bag. In some examples, "associated" may be understood as "fluidically connected". In some examples, the bag is connected to the outside of the printhead via a fluid channel. The fluid arrives into the bag via the fluid channel. The bag may expand when the fluid, such as air, is introduced therein, such fluid reaching a determined pressure in the bag.

An example printhead may also include a lever valve delimiting a printhead chamber. In some examples, the lever valve is configured to be displaced in the direction of a pressure exerted on the lever valve. The lever valve may be actuated by the inflation of the bag. In particular, while the bag is inflated, the bag can be in contact with the lever valve, such that an increasing pressure is exerted by the bag over the lever valve. The lever valve is then displaced in the direction of the pressure exerted over it as the bag is inflated. The lever valve may be displaced from a rest position to a final position. The displacement of the lever valve progressively increases a pressure at die level. Once the lever valve has reached its final position, the pressure at the die level no longer increases. One should note that while the pressure at die level is related to the pressure in the bag, such pressures do not have to be the same.

An example printhead may further include a fluid ejection device which ejects drops of printing fluid or printing fluid through a plurality of orifices or nozzles. In some examples, the printhead is a thermal inkjet printhead whereby the ejection of a drop is caused by heat produced by a thermal resistor. The heat allows vaporizing printing fluid and creates bubbles that force printing fluid drops out of nozzles. In some examples, the printhead is a piezoelectric printhead whereby the ejection of a drop is caused by the mechanical energy produced by a piezo electrical element. In some examples of piezoelectric printhead, a piezoelectric material actuator is employed as an ejection element to generate pressure pulses that force printing fluid drops out of nozzles.

In some examples, when the bag is deflated, the at least one lever valve blocks the fluid ejection device, preventing or reducing the ejection of drops of printing fluid through the nozzles. In some examples, when the bag is inflated, the displacement of the lever valve releases the fluid ejection device, such that drops of printing fluid can be ejected through the nozzles, the displaced lever valve allowing release of printing fluid.

In some examples, the printhead is a non-scanning type printhead in which a position of the printhead is fixed. In some examples, the printhead is a scanning type printhead in which a position of the printhead changes over time. In particular, the printhead performs a back and forth movement during printing, such that its position changes. The printhead is in some examples associated to a printing fluid color or to several printing fluid colors. Printing fluid colors are in some examples White (W), Cyan (C), Magenta (M), Yellow (Y) and Black (K).

In some examples, the drops of printing fluid are directed toward a substrate, such as a print substrate, so as to print onto the print substrate. A print substrate includes any type of suitable sheet material, such as paper, card stock, transparencies, Mylar, fabric, and the like. In some examples, nozzles are arranged in a column such that properly sequenced ejection of printing fluid from nozzles causes characters, symbols, and/or other graphics or images to be printed upon print substrate as printhead and print substrate are moved relative to each other.

Method 100 comprises, in block 101, applying a first control signal to a pump, the first control signal corresponding to a first target pressure. In some examples, the first control signal is a variable tension that may be induced by a variable tension source. In some examples, the first control signal is a pulse width modulation control signal.

The pump may be configured to release a fluid in response to the first control signal. In some examples, the pump is a diaphragm pump. In some examples, the pump is a piston pump. In some examples, the pump is an air pump configured to release pressurized air when the first control signal is applied to the pump. In some examples, the pump and the bag are fluidically connected, the pressurized air being able to travel from the pump to the bag.

The first target pressure may correspond to a pressure exerted on the bag when pressurized air released by the pump in response to the first control signal is introduced in the bag. Depending on a value of the first control signal, an amount of pressurized air released by the pump changes. In some examples, the greater the magnitude of the first control signal, the greater the amount of pressurized air released by the pump. Then, the pressure exerted on the bag by pressurized air increases as the value of the magnitude of the first control signal increases. In order to reach the first target pressure, the first control signal may be applied to the pump during a first period of time that will be described later with reference to FIG. 1B.

Method 100 comprises, in block 102, directly following the application of the first control signal, applying a second control signal to the pump, the second control signal corresponding to a second target pressure lower than the first target pressure. In some examples, the second control signal is a variable tension that may be induced by a variable tension source. In some examples, the second control signal is a pulse width modulation control signal.

The pump may be further configured to release pressurized air when the second control signal is applied to the pump. The second target pressure may correspond to a pressure exerted on the bag when pressurized air released by the pump in response to the second control signal is introduced in the bag. Depending on a value of the second control signal, the amount of pressurized air released by the pump changes. In some examples, the greater the magnitude of the second control signal, the greater the amount of pressurized air released by the pump. Then, the pressure exerted on the bag by pressurized air increases as the value of the magnitude of the second control signal increases. In some examples, the second target pressure is maintained constant during a second period of time, the second period of time corresponding to a period of time during which the second control signal is applied to the pump. The second period of time will be described later with reference to FIG. 1B.

In some examples, the second target pressure is 1% to 80% lower than the first target pressure. In some examples, the second target pressure is 10% to 80% lower than the first target pressure. In some examples, the second target pressure is 20% to 75% lower than the first target pressure. In some examples, the second target pressure is 30% to 75% lower than the first target pressure. In some examples, the second target pressure is 40% to 70% lower than the first target pressure. In some examples, the second target pressure is 50% to 70% lower than the first target pressure. In some examples, the second target pressure is 1% to 30% lower than the first target pressure. In some examples, the second target pressure is 2% to 20% lower than the first target pressure. In some examples, the second target pressure is 3% to 15% lower than the first target pressure. In some examples, the second target pressure is 4% to 12% lower than the first target pressure. In some examples, the second target pressure is 5% to 10% lower than the first target pressure.

The first target pressure being higher than the second target pressure, the method 100 allows achieving the second target pressure in the bag faster than if the second control signal was applied directly to the pump without first applying the first control signal. This permits reaching the pressure desired for efficient blow priming rapidly. In particular, since the pressure at die level no longer increases when the lever valve has reached its final position, rapidly achieving the second target pressure accelerates the displacement of the lever valve, such that a higher pressure at die level is achieved faster. Higher pressure at the die level is useful for removing debris from the printhead and/or substantially preventing or dissolving printing fluid plugs in the nozzles, so that priming is more efficient.

Figure 1B:
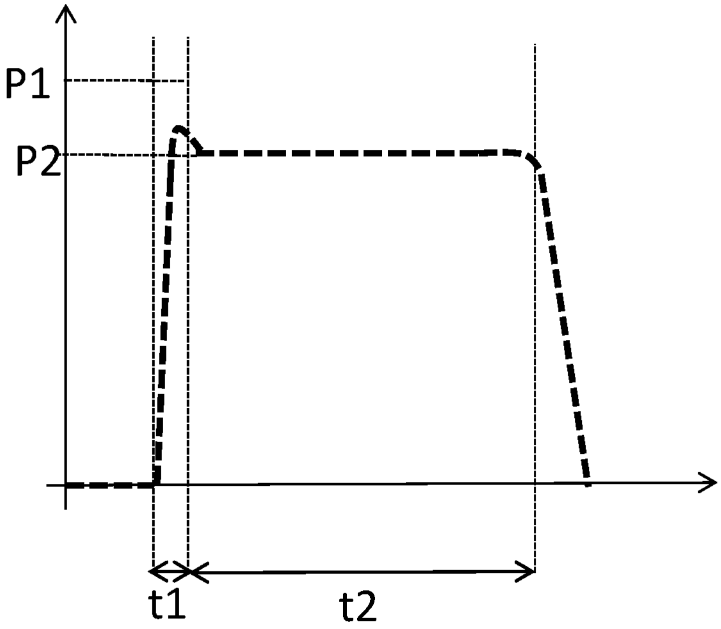
FIG. 1B is an example plot of the evolution of a pressure exerted on a bag housed on the printhead over time while the example method of FIG. 1A is carried out.

FIG. 1B shows an example plot of the evolution of a pressure exerted on the bag over time when the example method of FIG. 1A is carried out. The first target pressure is referenced P1 and the second target pressure is referenced P2. As previously said, the second target pressure P2 is lower than the first target pressure P1. P1 being a target pressure, it is possible that target pressure P1 does not get reached into the bag, due to pump inertia. Using such relatively high target pressure P1 however permits reaching a relatively lower target pressure P2 more rapidly, by somehow boosting the pump. The first period of time is referenced t1. As previously said, the first target pressure P1 is targeted when the first control signal is applied to the pump during the first period of time t1. As shown, during the first period of time t1, the pressure exerted on the bag increases rapidly from zero pressure towards the first target pressure P1. In some examples, the first period of time t1 is comprised in a range from 10 milliseconds to 500 milliseconds. In some examples, the first period of time t1 is comprised in a range from 20 milliseconds to 300 milliseconds. In some examples, the first period of time t1 is comprised in a range from 30 milliseconds to 200 milliseconds. In some examples, the first period of time t1 is comprised in a range from 40 milliseconds to 100 milliseconds. In some examples, the first period of time t1 is comprised in a range from 45 milliseconds to 100 milliseconds. In some examples, the first period of time t1 is comprised in a range from 50 milliseconds to 70 milliseconds.

The second period of time is referenced t2 in FIG. 1B. The second target pressure P2 is targeted and aimed at being reached during the second period of time t2. The second period of time t2 corresponds to the time during which the second control signal is applied to the pump. In some examples, the second period of time t2 is comprised in a range from 0.5 second to 3 seconds. In some examples, the second period of time t2 is comprised in a range from 0.7 second to 3 seconds. In some examples, the second period of time t2 is comprised in a range from 1 second to 3 seconds. In some examples, the second period of time t2 is comprised in a range from 1.5 second to 2.5 seconds. In some examples, the second period of time t2 is comprised in a range from 0.5 second to 2 seconds.

The first period of time t1 is in some examples shorter than the second period of time t2.

In some examples, the first and the second control signals are applied to the pump once a day. In some examples, the first and the second control signals are applied to the pump before each printing. In some examples, a periodicity of the application of the first and the second control signals depends on the printing fluid color associated to the printhead. In some cases, when the printing fluid color is White (W), the first and the second control signals may be applied to the pump before each printing. In some cases, when the printing fluid is Black (K), Cyan (C), Magenta (M) or Yellow (Y), the first and the second control signals may be applied to the pump when obstructions are detected. In some examples, the periodicity of the application of the first and the second signals depends on a type of the printing fluid. In some cases, when the printing fluid is an overcoat printing fluid, the first and the second control signals may be applied to the pump before each printing. In some cases, when the printing fluid is a pretreatment printing fluid, the first and the second control signals may be applied to the pump when obstructions are detected. "Overcoat printing fluid" should be understood as a composition that is applied over a printed output. The overcoat printing fluid may be used to apply over the printed output a finish, such as gloss, or to constitute a protective layer. "Pretreatment printing fluid" should be understood as a composition that is applied to treat a surface of the print substrate before ejecting on it drops of other printing fluids such as colored printing fluids. In some examples, the pretreatment printing fluid may be used to control an interaction between the printing fluids and the print substrate, a hardening of the printing fluids and/or a fixation of the printing fluids to the print substrate. In some examples, the pretreatment printing fluid may be used to influence a durability of the printed output on the substrate, influencing a gloss effect and/or influencing a texture of the printed image.

Figure 2A:
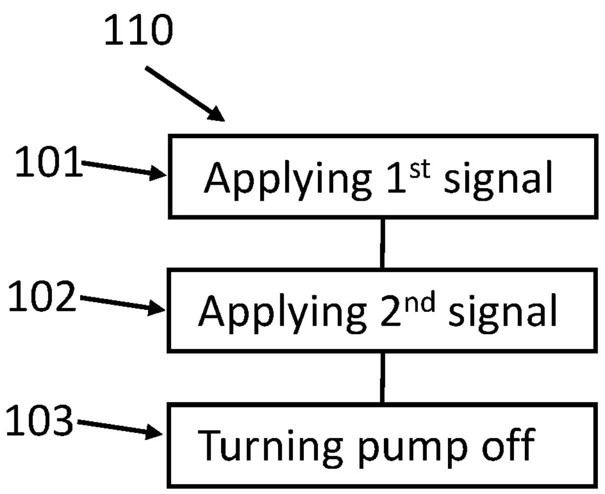
FIG. 2A is a block diagram of a second example method for priming a printhead according to the present disclosure.

FIG. 2A illustrates a second example method 110 for priming a printhead. Method 110 comprises blocks 101 and 102 as described in the context of first example method 100. Method 110 further comprises, in block 103, turning the pump off during a third period of time following the second period of time, the second period of time being shorter than the third period of time.

By "turning the pump off" it is understood that the pump does not release fluid during the third period of time. The third period of time may correspond to the periodicity at which the first and the second control signals are applied to a pump. In some examples, the third period of time may be one day. In some examples, the third period of time may last a period of time between each printing. In some examples, the third period of time depends on the printing fluid color and/or the type of printing fluid associated to the printhead 210. In some cases, when the printing fluid color is White (W) or an overcoat printing fluid, the third period of time depends on the period of time between each printing. Introducing a time during which the pump is turned off permits limiting energy consumption.

Figure 2B:
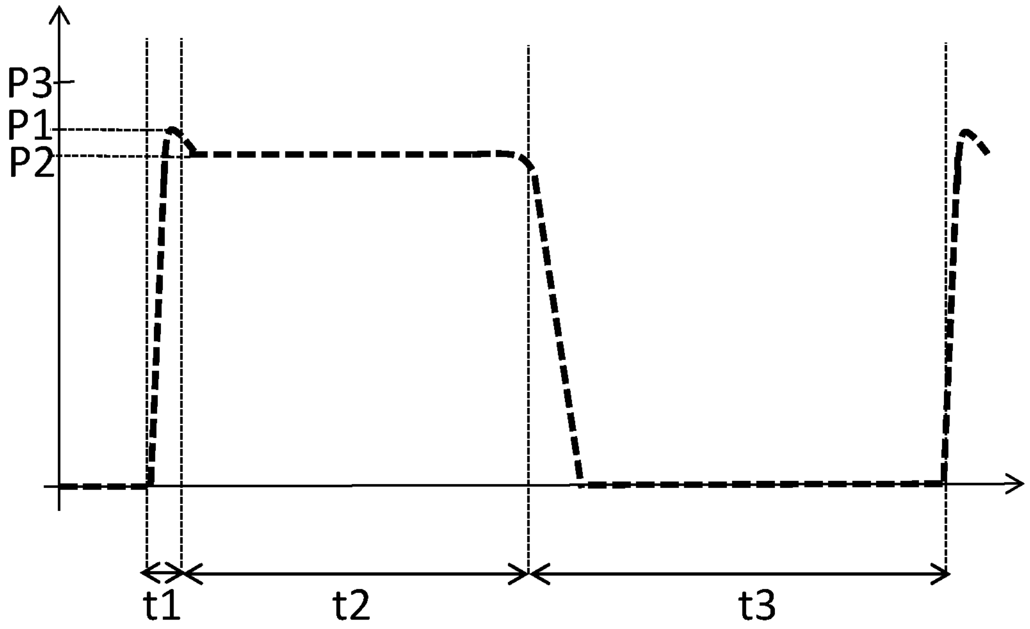
FIG. 2B is an example plot of the evolution of a pressure exerted on a bag housed on the printhead over time while the example method of FIG. 1A is carried out.

FIG. 2B shows an example plot of the evolution of the pressure exerted on the bag over time when the example method 110 of FIG. 2A is carried out. As for FIG. 1B, the first target pressure is referenced P1, the second target pressure is referenced P2, the first period of time is referenced t1 and the second period of time is referenced t2. In this example, both target pressures P1 and P2 are effectively reached. The example plot of FIG. 2B also shows a third target pressure P3 which corresponds to a maximum pressure supported by the bag without breaking. In some examples, the maximum pressure is comprised in a range from 0.01 MPa to 0.1 MPa. In some examples, the maximum pressure is comprised in a range from 0.015 MPa to 0.8 MPa. In some examples, the maximum pressure is comprised in a range from 0.02 MPa to 0.6 MPa. In some examples, the maximum pressure is comprised in a range from 0.025 MPa to 0.05 MPa. In some examples, the maximum pressure is comprised in a range from 0.03 MPa to 0.04 MPa.

As shown in FIG. 2B, the first target pressure P1 is lower than the maximum pressure P3 supported by the bag. The first target pressure P1 being lower than the third target pressure P3, the risk of breaking the bag is limited when the first control signal is applied to the pump. In some examples, the first target pressure is 1% to 50% lower than maximum pressure supported by the bag. In some examples, the first target pressure is 2% to 40% lower than the maximum pressure supported by the bag. In some examples, the first target pressure is 3% to 25% lower than the maximum pressure supported by the bag. In some examples, the first target pressure is 4% to 15% lower than the maximum pressure supported by the bag. In some examples, the first target pressure is 5% to 10% lower than the maximum pressure supported by the bag.

In FIG. 2B, the third period of time is referenced t3. As previously said, the third period of time t3 follows the second period of time t2. In some examples, the second period of time t2 is shorter than the third period of time t3.

In some examples, the values of the first and the second control signals are determined thanks to a calibration process. The calibration process may for example be carried out during a manufacturing process of the printhead. The calibration process may comprise completing concatenated primes of the printhead with a plurality of control signals, each control signal having a different value. A relation between the value of each control signal and the pressure inside the bag may be then established. A maximum pressure P3 supported by the bag may also be determined through a calibration process. The second control signal may correspond to the value of the control signal that allows reaching and maintaining the second target pressure P2 inside the bag. The first control signal may correspond to the value of the control signal associated to a pressure inside the bag substantially greater than the second target pressure P2, but lower than the maximum pressure P3 supported by the bag.

In some examples, the example methods 100 or 110 are an open-loop control method. Open-loop control method should be understood as a method in which no feedback loop is used. In particular, in methods 100, 101 it is possible to determine the value of the control signal to reach the second target pressure P2 in the bag, without reading the actual pressure inside the bag. Determining the actual pressure inside the bag may then possibly take place without sensors. Imprecise measures of pressure inside the bag and other failures related to the use of sensors or other devices are then limited or suppressed by using the methods 100, 110 for priming the printhead. Costs associated with the use and maintenance of sensors and other devices are also reduced. In addition, since the first control signal is associated to the first target pressure P1 which is greater than the second target pressure P2 but lower than the maximum pressure P3 supported by the bag, the second target pressure P2 in the bag can be reached rapidly.

The present disclosure also relates to a printer comprising a printhead provided with a bag associated with the pump. In some examples, the printer is a scanning printhead printer. In some examples, the printer is a non-scanning printhead printer. In some examples, the printer is a page-wide array printer. In some examples, the printer is a three dimensional (3D) printer. In some examples, the printer is a dye-sublimation printer. In some examples, the printer is a fluidjet printer.

An example printer can include a fluid ejection assembly, such as a printhead assembly, and a fluid supply assembly.

In some examples, the printhead assembly comprises a plurality of printheads as described above. Each printhead is in some examples associated to a printing fluid color or to several printing fluid colors. In some examples, the printhead assembly is a scanning type printhead assembly. In some examples, the printhead assembly is a non-scanning type printhead assembly. An example of non-scanning type printhead assembly is a page-wide array printer printhead assembly.

An example fluid supply assembly supplies printing fluid to the printhead assembly, in some examples to each printhead. The fluid supply assembly may include a reservoir for storing printing fluid. In some examples, printing fluid flows from a reservoir to the printhead assembly. In some examples, the printhead assembly and the fluid supply assembly are housed together in a fluidjet print cartridge. In some examples, the fluid supply assembly is separated from the printhead assembly and supplies printing fluid to the printhead assembly through an interface connection or physical interface connection such as a supply tube.

The printer can also include one or more of a carriage assembly, a print substrate transport assembly, a service station assembly, and an electronic printer controller.

An example carriage assembly can position the printhead assembly relative to a print substrate transport assembly. The print substrate transport assembly can position the print substrate relative to the printhead assembly. Thus, a print zone may be defined adjacent to nozzles in an area between the printhead assembly and the print substrate. In a scanning type printhead assembly, the carriage assembly moves the printhead assembly relative to the print substrate transport assembly. In a non-scanning type printhead assembly, the carriage assembly fixes the printhead assembly at the prescribed position relative to the print substrate transport assembly. A carriage speed corresponds to a speed at which the carriage assembly is able to position the printhead assembly relative to the print substrate transport assembly.

An example service station assembly provides for spitting, wiping, capping, and/or priming of a printhead assembly in order to maintain a functionality of the printhead assembly and, more specifically, of nozzles. In some examples, the service station assembly may include a primer which is periodically activated to limit developing of unwanted obstructions in the pathway of the printing fluid. In some examples, the primer is a blow type primer able to apply blow priming as previously defined. In some examples, the pump employed in methods 100, 110 above described is part or the primer. Pressurized air, or air above atmospheric pressure, may then come from or be released by the pump associated to the bag, and be introduced in such bag. In some examples, the primer is activated before each printing. In some examples, the periodicity of the activation of the primer depends on the printing fluid color associated to the printhead. In some cases, in some examples when the printing fluid color is White (W), the primer may be activated before each printing operation. In some cases, when the printing fluid is Black (K), Cyan (C), Magenta (M) or Yellow (Y), the primer may be activated when obstructions are detected. In some examples, the periodicity of the activation of the primer depends on a type of the printing fluid. In some cases, when the printing fluid is an overcoat printing fluid, the primer may be activated before each printing operation. In some cases, when the printing fluid is a pretreatment printing fluid, the primer may be activated when obstructions are detected. In some examples, the primer is activated once a day.

In some examples, the service station assembly may include a rubber blade or wiper which is periodically passed over the printhead assembly to wipe and clean nozzles of excess printing fluid. In addition, the service station assembly may include a cap which covers the printhead assembly to protect nozzles from drying out during periods of non-use. In addition, the service station assembly may include a spittoon or a secondary or additional spittoon into which the printhead assembly ejects printing fluid to insure that a reservoir maintains an appropriate level of pressure and fluidity, and help avoid that nozzles do clog or weep excessively. Functions of the service station assembly may include relative motion between the service station assembly and the printhead assembly. During operation, plugs in the printhead can be periodically cleared by firing a number of drops of printing fluid through each of the nozzles in a process named "spitting," with the waste printing fluid being collected in a spittoon reservoir portion of the service station. In some examples the service station comprises a web wipe where printheads are cleaned through a web of cloth. Such cloth may or may not be impregnated with a fluid participating in the cleaning process of the nozzles. An example of such fluid is low molecular weight PEG (polyethylene glycol). Such various functions of a service station may be combined with the example priming methods hereby described.

An example electronic printer controller communicates with the printhead assembly, the carriage assembly, the print substrate transport assembly, and the service station assembly. Thus, in some examples, when the printhead assembly is mounted in the carriage assembly, the electronic printer controller and the printhead assembly communicate via the carriage assembly. An example electronic printer controller also communicates with the fluid supply assembly such that a new (or used) printing fluid supply may be detected, and a level of printing fluid in the printing fluid supply may be detected. In some examples, the controller is an electronic printer controller which includes a processor and a memory or storage component and other electronic circuits for communication including receiving and sending electronic input and output signals.

An example electronic printer controller receives data from a host system, such as a computer, and may include memory for temporarily storing data. Data may be sent to the printer along an electronic, infrared, optical or other information transfer path. Data represent, in some examples, a pressure to be applied to the bag. The controller also controls the application of control signals to the pump associated to the bag in the printhead.

An example electronic printer controller may also be connected to sensors able to determine the presence of obstructions in the pathway of the printing fluid. In some examples, sensors may be configured to detect quality defects in a printed output, such as missing points or misalignment in printed data.

Figure 3:
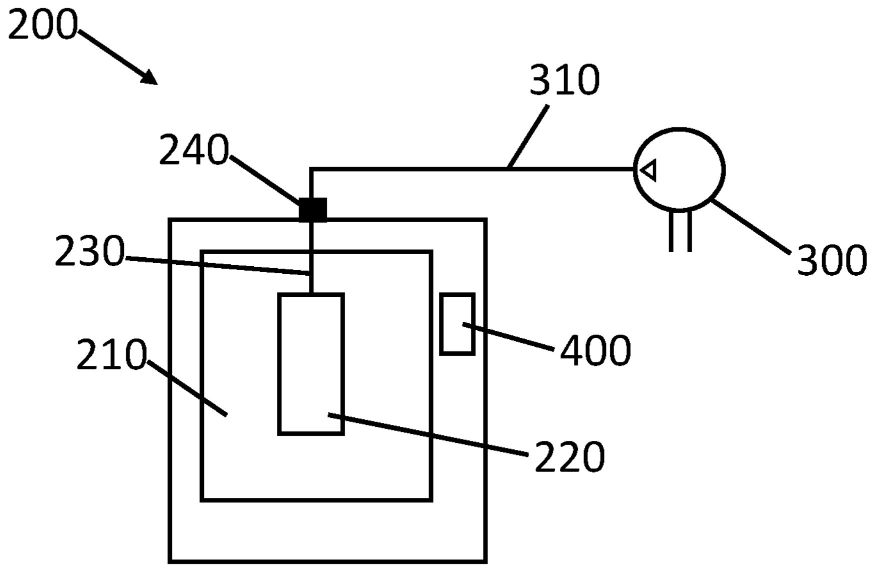
FIG. 3 is a schematic illustration of an example printer comprising an example printhead in a first position.
Figure 4:
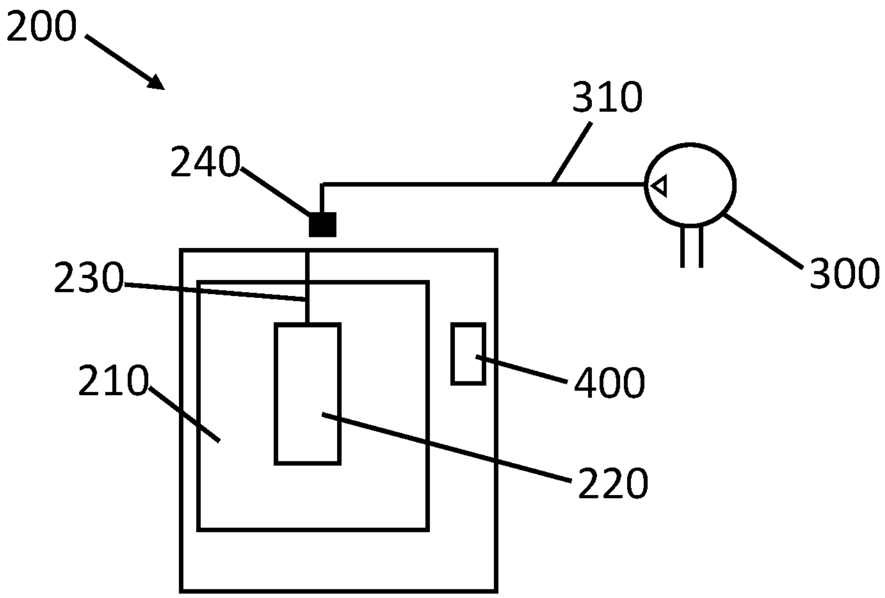
FIG. 4 is a schematic illustration of the example printer of FIG. 3 comprising the example printhead in a second position.

FIGS. 3 and 4 show an example printer 200. The printer 200 comprises a printhead 210 provided with a bag 220. The printhead 210 and the bag 220 may have the features of the example printhead and the example bag described above. The bag 220 is associated with a pump 300 as described above.

The printer 200 further comprises a controller 400. The controller 400 may be configured to apply a first command signal to the pump 300, the first command signal corresponding to a first target pressure. The first command signal corresponds to the first control signal described above, so that the first target pressure corresponds to the first target pressure P1. The controller 400 may be further configured to, directly following the application of the first command signal, apply a second command signal to the pump, the second command signal corresponding to a second target pressure lower than the first target pressure P1. The second command signal corresponds to the second command signal described above, so that the second target pressure corresponds to the second target pressure P2. As previously said, the first target pressure P1 is higher than the second target pressure P2. The second target pressure P2 in the bag may then be achieved faster than if the second control signal was applied directly to the pump 300 without first applying the first control signal. The first and the second signal may be determined by the calibration process explained above.

In some examples, the pump 300 is connected to a first end of an unobstructed fluid conduct 310. In some examples, "unobstructed fluid conduct" may be understood as a hollow fluid conduct, in which no element is housed. In some examples the unobstructed fluid conduct has a substantially constant cross section, for example in order to reduce or suppress pressure losses. The unobstructed fluid conduct 310 may be made of a flexible polymeric material. A second end of the unobstructed fluid conduct 310 may be connected to the printhead 210. The second end of the fluid conduct 310 is in some examples opposite to its first end. In particular, in a first position of a printhead 210, the second end of the unobstructed fluid conduct 310 is connected to the printhead 210. The second end of the unobstructed fluid conduct 310 is more precisely connected the bag 220. In some examples, the second end of the unobstructed conduct 310 may be in particular connected to a fluid channel 230 extending from the bag 220 to the outside of the printhead 210. This first position of the printhead 210, which is shown in FIG. 3, is hereinafter called "priming position". In the priming position, the bag 220 and the pump 300 are then directly connected by the unobstructed fluid conduct 310. Pressurized air coming from the pump 300 can then be introduced in the bag 220 when the printhead 210 is in the priming position. In a second position of the printhead 210, the second end of the unobstructed fluid conduct 310 is free. In the second position, shown in FIG. 4, the pump 300 is then directly fluidically connected to the external environment. The second position is hereinafter called "printing position".

The first control signal and the second control signal are applied to the pump 300 when the printhead 210 is in the priming position. In fact, if the first or the second control signal were applied to the printhead 210 in the printing position, pressurized air would be released to the external environment, due to the fact that the fluid conduct 310 is unobstructed. Using an unobstructed fluid conduct has the advantage of reducing or suppressing pressure losses between the bag and the pump during priming. The controller 400 may then be also configured to place the printhead 210 in the priming position during the application of the first and second command signals.

As previously said, the printhead 210 may be a scanning type printhead or a non-scanning type printhead. In some examples, the unobstructed fluid conduct 310 has a fixed position. This may be the case when the printhead 210 is a scanning type printhead. In this case, in order to switch between the priming position and the printing position, the printhead 210 is displaced from a position wherein the fluid conduct 310 is aligned with the fluid channel 230, to a position wherein the fluid channel 230 and the fluid conduct 310 are not aligned. When several printheads are included in the printhead assembly, the displacement of the printhead may allow changing the printhead which is in the priming position. In some examples, the unobstructed fluid conduct 310 can be displaced along the printhead assembly. This may be the case when the printhead 210 is a non-scanning type printhead. In this case, in order to switch between the priming position and the printing position, the fluid conduct 310 is displaced from a position wherein the fluid conduct 310 is aligned with the fluid channel 230, to a position wherein the fluid channel 230 and the fluid conduct 310 are not aligned. When several printheads are included in the printhead assembly, the displacement of the fluid conduct 310 along the printhead assembly may allow changing the printhead which is in the priming position.

In some examples, an actuator 240 is configured to place the printhead 210 in the priming position. The actuator 240 may be installed at the second end of the fluid conduct 310. In the priming position, the actuator 240 ensures the connection between the bag 220 and the pump 300 via the fluid conduct 310. In some examples, the actuator 240 engages the printhead 210 before priming. In particular, the actuator 240 engages the bag 220 or the fluid channel 230 before priming. When the actuator 240 engages the printhead 210, the printhead 210 is then in the priming position. After priming, the actuator 240 disengages the printhead 210, such that the printhead 210 is in the printing position. When the printhead 210 is a scanning type printhead, the back and forth movement of the printhead may not take place when the actuator 240 engages the printhead 210. Printing is then not taking place in the priming position. When the actuator 240 disengages the printhead 210, the back and forth movement of the scanning type printhead may take place. Printing may then take place in the printing position. In some examples, the actuator 240 is a pneumatic actuator. In some examples, the actuator 240 is a lever actuated by the printhead carriage described above. In some examples, the actuator 240 is an electromagnetic actuator, such as a solenoid.

Figure 5:
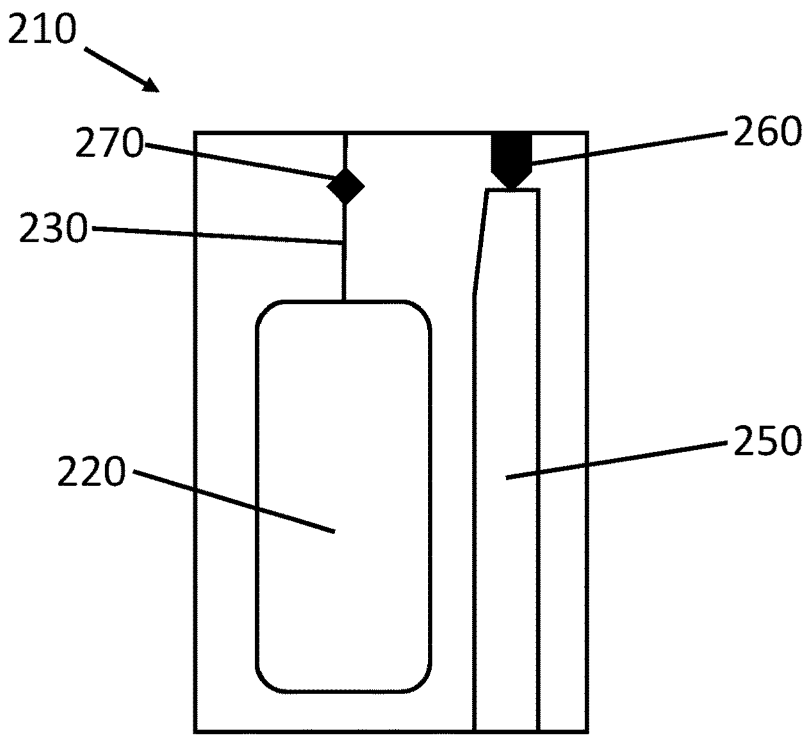
FIG. 5 is a schematic illustration of an example printhead in a first configuration.
Figure 6:
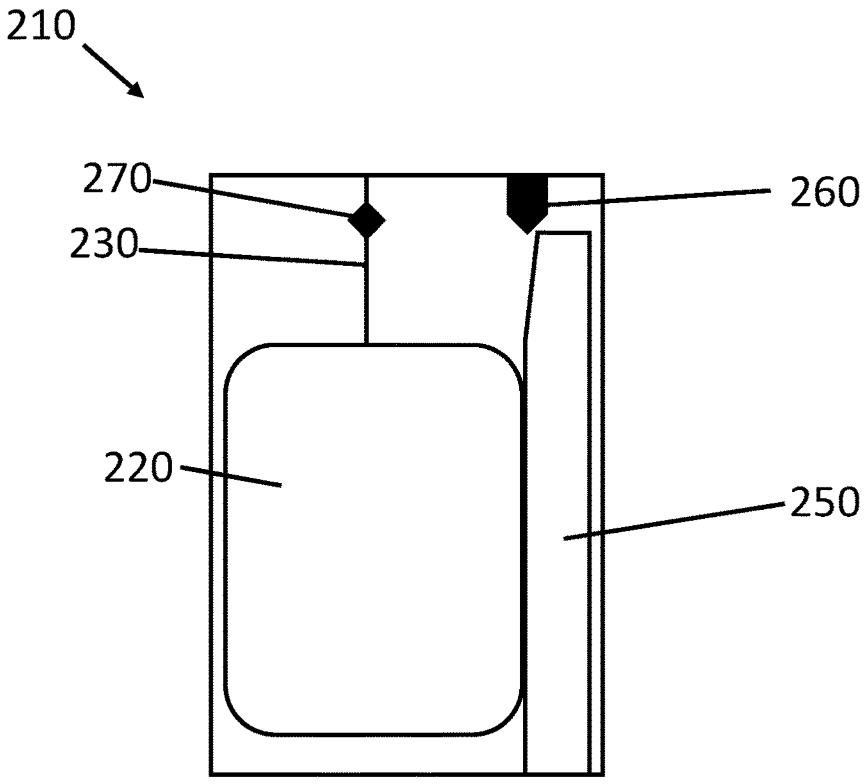
FIG. 6 is a schematic illustration of the example printhead of FIG. 5 in a second configuration.

In the priming position, pressurized air released by the pump 300 in response to the first and the second control signals is introduced in the bag 220. The introduction of pressurized air in the bag 220 allows the bag 220 to change from a deflated state, shown in FIG. 5, to an inflated stated, shown in FIG. 6. As previously explained, when the bag 220 is inflated, a pressure is exerted by the bag 220 on at least a lever valve 250 adjacent to the bag 220. The at least one lever valve 250 is then displaced in the direction exerted by the pressure. This displacement unblocks a fluid ejection device 260, so that printing fluid may be ejected. The at least one lever valve 250 is then actuated by inflation of the bag 220, and is to release printing fluid so that a fluid pressure peak appears in the nozzle plate. The peak in nozzle plate pressure is useful for removing debris from the printhead 210 and/or substantially preventing or dissolving printing fluid plugs in the nozzles. The priming position allows performing a prime in the printhead 210 in order to reduce or remove printing fluid plugs that may be found in the pathway of the printing fluid. In some examples, the printhead 210 is to print a pigmented printing fluid. An example pigmented printing fluid may be a printing fluid comprising latex.

As said above, in the priming position the pump 300 and the bag 220 are directly connected by the unobstructed fluid conduct 310. A seal 270 may be comprised in the printer 200 in order to seal the unobstructed fluid conduct 310 against the printhead 210. The seal 270 may be in some examples a ring-shaped seal. In some examples, the ring-shaped seal is disposed around the second end of the fluid conduct 310. In some examples the ring-shaped seal is disposed adjacent to the actuator 240. In some examples, the seal 270 is provided out of the fluid conduct 310, such that no frictional forces appear between the pressurized air and the seal 270. In some examples, the seal 270 is made of rubber. In some examples, the seal 270 is made of neoprene. In some examples, the seal 270 is made of silicon. In some examples, the seal 270 is made of nitrile.

In some examples, the printer 200 is a printer in which no feedback loop is used for operating the priming pump. In particular, as previously explained, in the printer 200 it is possible to determine the value of the command signal to reach the second target pressure in the bag 220 without reading the actual pressure inside the bag 220. It is possible not to use pressure sensors for reaching the desired pressure inside the bag 220 in order to proceed with priming, such that imprecisions and other failures related to the use of pressure sensors are limited. Costs associated with the use and maintenance of sensors and other devices are also reduced. In addition, since the first command signal is associated to the first target pressure P1 which greater than the second target pressure P2 but lower than the maximum pressure P3 supported by the bag 220, the second target pressure in the bag 220 can be reached more quickly. The printer 200 thereby allows reducing costs and improving performances.

Figure 7:
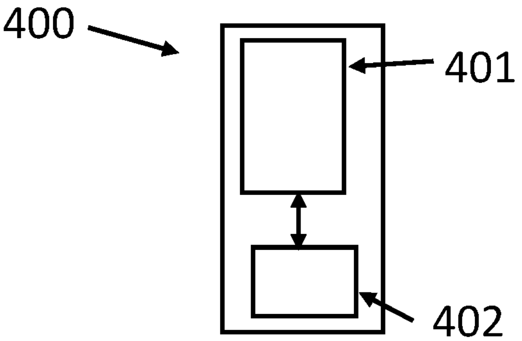
FIG. 7 is a block diagram of an example printer controller according to the present disclosure.
Figure 8:
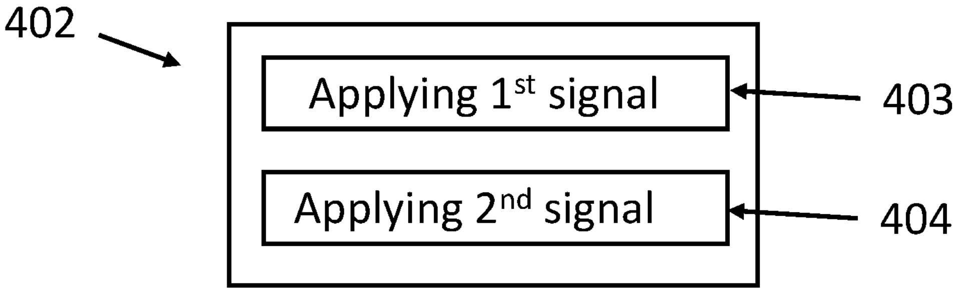
FIG. 8 is a block diagram of an example of a machine-readable or computer readable storage medium according to the present disclosure.

The present disclosure also relates to a non-transitory machine-readable or computer readable storage medium 402 as represented in FIGS. 7 and 8. The storage medium 402 may be included in the controller 400. The storage medium 402 may include any electronic, magnetic, optical, or other physical storage device that stores executable instructions. Storage medium 402 may be, in some examples, Random Access Memory (RAM), an Electrically-Erasable Programmable Read-Only Memory (EEPROM), a storage drive, an optical disk, and the like.

Storage medium 402 may be coupled to a processor 401. The processor 401 may be also included in the controller 400. The processor 401 may be a central processing unit. In some examples, the processor 401 comprises an electronic logic circuit or core and a plurality of input and output pins for transmitting and receiving data.

The non-transitory machine-readable storage medium is encoded with instructions for priming the printhead 210 as described above. The instructions are comprised in an instruction set. The instruction set cooperates with the processor 401 and the storage medium 402. In some examples, instruction set comprises executable instructions for the processor 401, the executable instructions being encoded in storage medium 402.

The instruction set comprises instructions 403 to apply a first signal to the pump 300, the first signal corresponding to a first threshold pressure. The first signal corresponds to the first control signal described above. The first threshold pressure corresponds to the first target pressure P1 described above.

The instruction set further comprises instructions 404 to apply a second signal to the pump 300 after applying the first signal, the second signal corresponding to a second threshold pressure lower than the first threshold pressure. The second signal corresponds to the second control signal described above. The second threshold pressure corresponds to the second target pressure P2 described above.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any some examples may be used alone, or in combination with other features described, and may also be used in combination with any features of any other of the examples, or any combination of any other of the examples.

What is claimed is:

1. A printer comprising a printhead provided with a bag associated with a pump, the printer comprising a controller to:

apply a first command signal to the pump, the first command signal causing a first target positive pressure in the bag; and directly following the application of the first command signal, apply a second command signal to the pump, the second command signal causing a second target positive pressure in the bag lower than the first target positive pressure to prime the printhead by forcing printing fluid out of nozzles in the printhead.

2. The printer according to claim 1, wherein the printhead is to print a printing fluid comprising latex.

3. The printer according to claim 1, wherein the printhead is a scanning printhead, whereby the controller is to place the printhead in a priming position during the application of the first and second command signals, and whereby the pump and the bag are directly connected by an unobstructed fluid conduct when the printhead is in the priming position.

4. The printer according to claim 3, whereby the pump is directly fluidically connected to the external environment when the printhead is in a printing position.

5. The printer according to claim 3, the printer comprising an actuator to place the printhead in the priming position.

6. The printer according to claim 3, the printer comprising a seal to seal the unobstructed fluid conduct.

7. The printer according to claim 1, wherein at least one lever valve is adjacent to the bag, is actuated by inflation of the bag, and is to release printing fluid.

* * * * *